United States Patent
Opheij et al.

[11] Patent Number: 6,052,237
[45] Date of Patent: Apr. 18, 2000

[54] OBJECTIVE LENS AND SCANNING DEVICE USING SUCH AN OBJECTIVE LENS

[75] Inventors: Willem G. Opheij; Josephus J. M. Braat, both of Eindhoven, Netherlands

[73] Assignee: U.S. Philips Corporation, New York, N.Y.

[21] Appl. No.: 08/812,191

[22] Filed: Mar. 6, 1997

[30] Foreign Application Priority Data

Mar. 8, 1996 [WO] WIPO ............. PCT/IB96/00182
Jul. 5, 1996 [EP] European Pat. Off. ............. 96201888

[51] Int. Cl.[7] ................ G02B 3/02; G02B 3/10; G11B 7/00
[52] U.S. Cl. ............. 359/719; 359/721; 359/724; 369/44.23; 369/44.24
[58] Field of Search ............... 359/719, 721, 359/724; 369/44.23, 44.24

[56] References Cited

U.S. PATENT DOCUMENTS

| | | |
|---|---|---|
| 4,426,696 | 1/1984 | Brenden et al. .............. 359/719 |
| 5,446,565 | 8/1995 | Komma et al. .............. 359/19 |
| 5,703,862 | 12/1997 | Lee et al. .............. 369/44.23 |
| 5,708,638 | 1/1998 | Braat et al. .............. 369/112 |
| 5,734,512 | 3/1998 | Shin et al. .............. 359/721 |
| 5,737,294 | 4/1998 | Yamakawa et al. .............. 369/44.23 |

FOREIGN PATENT DOCUMENTS 06215406 8/1994 Japan .

Primary Examiner—Georgia Epps
Assistant Examiner—Evelyn A. Lester
Attorney, Agent, or Firm—F. Brice Faller

[57] ABSTRACT

A scanning device for optical record carriers is provided with an objective lens (7) suitable for scanning record carriers (1, 21) having a transparent substrate (2, 23) of different thicknesses. The lens comprises an outer annular part (25) and an inner central part (26) within the annular part. Only the central part of the lens is used for forming a focus through a first substrate (2) having a first thickness. The central part is corrected for the spherical aberration of the first substrate. The annular and central part of the lens are used for forming a focus through a second substrate (23) having a different, second thickness. The annular part is corrected for the spherical aberration of the second substrate.

6 Claims, 2 Drawing Sheets

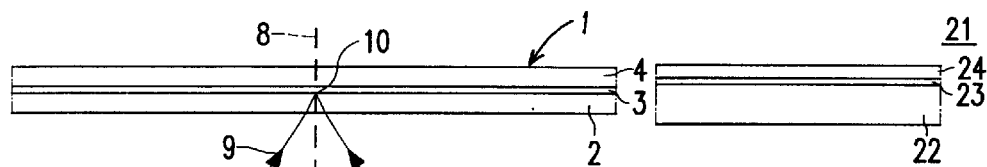
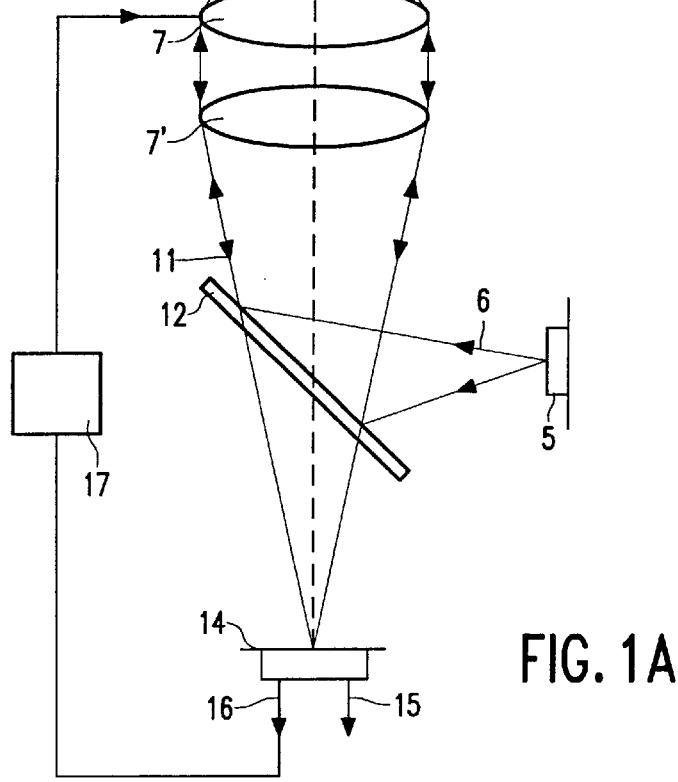
FIG. 1B
FIG. 1A
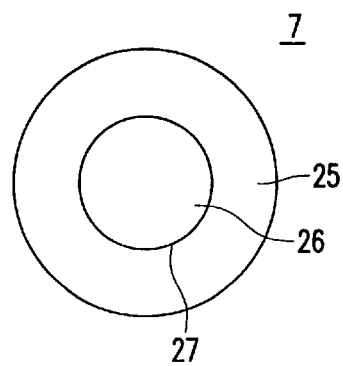
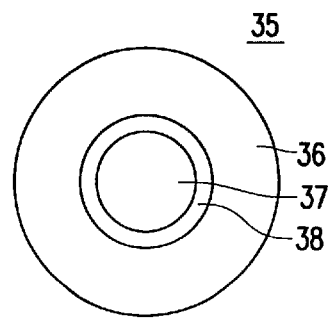
FIG. 2A FIG. 2B

OBJECTIVE LENS AND SCANNING DEVICE USING SUCH AN OBJECTIVE LENS

BACKGROUND OF THE INVENTION

The invention relates to an objective lens for focusing a radiation beam to a first focus through a first transparent layer having a first thickness and to a second focus through a second transparent layer having a different second thickness. The invention also relates to an optical scanning device for scanning a first type of record carrier having a first information plane and a first transparent layer of a first thickness and for scanning a second type of record carrier having a second information plane and a second transparent layer of a second thickness different from the first thickness, comprising a radiation source for generating a radiation beam and an objective lens for converging the radiation beam through the first transparent layer to a first focus on the first information layer and for converging the radiation beam through the second transparent layer to a second focus on the second information layer. The scanning includes writing, reading and/or erasing information in the record carrier.

The transparent layer in optical record carriers has, in general, the function of protecting the information layer from environmental influences and providing mechanical support for the record carrier, i.e. it acts as a substrate for the information layer. The thickness of the transparent layer is a compromise between the desired stiffness of the record carrier and the numerical aperture of the radiation beam used for scanning the information layer. If for a new type of record carrier the numerical aperture is increased in order to increase the storage density of the information layer, it is often necessary to reduce the thickness of the transparent layer in order to reduce the influence of disc tilt on the quality of the radiation beam. As a consequence, there will be different types of record carrier on the market, having different thicknesses of the transparent layer. A compatible record player should be able to scan the different types of record carrier, irrespective of the thickness of the transparent layer.

The transparent layer, through which a radiation beam scans the information layer, introduces a so-called spherical aberration in the radiation beam. The spherical aberration is compensated in the objective lens, making the radiation beam near its focus substantially free from spherical aberration. If an objective lens compensated for a first thickness of the transparent layer is used for scanning a record carrier with a transparent layer of a second, different thickness, the quality of the focus will be deteriorated due to the under- or over-compensated spherical aberration.

The PCT application IB96/00182 to which Braat et al. U.S. Pat. No. 5,708,638 corresponds, describes a device for scanning optical record carriers of the first and second type. This device uses an objective lens designed for converging a radiation beam through the first transparent layer to a best focus on the first information layer. When scanning a record carrier of the second type, the objective lens forms a paraxial focus on the second information layer. The best focus of a beam is the point along the axis of the beam which has the highest intensity. The paraxial focus of a beam is the point along the axis of the beam through or towards which the paraxial rays of the beam are converged. The radiation reflected from the record carrier is detected by a radiation-sensitive detection system. When scanning a record carrier of the first type, the detection system uses all radiation in the reflected beam. When scanning a record carrier of the second type, the detection system detects only radiation from a central area of the cross section of the radiation beam. Since the objective lens is not designed for converging a radiation beam through the thickness of the second transparent layer, the radiation beam will incur uncorrected spherical aberration on passage through the second transparent layer. By restricting the detection to the central rays of the beam, the highly aberrated rays in the outer annular area of the beam will then have a reduced influence on the output signals of the detection system.

According to the invention the objective lens converges a radiation beam to a single best focus, the objective lens having an outer annular part which introduces a first spherical aberration in the radiation beam compensating for passage of the radiation beam through a first transparent layer having a first thickness, and a central part inside the annular part which introduces a second spherical aberration in the radiation beam compensating for passage of the radiation beam through a second transparent layer having a different, second thickness. In general, the annular part and the central part are concentric; the parts may be adjacent or be separated by an intermediate ring-shaped area.

When the objective lens converges a radiation beam through the second transparent layer, the rays of the beam passing through the central part form a second focus, the rays being corrected for the spherical aberration incurred in passing the second transparent layer. When the objective lens converges a radiation beam through the first transparent layer, the beam passing through the combined area of the annular part and the central part forms a first focus. In that case only the rays passing through the annular part are corrected for the spherical aberration incurred in passing the first transparent layer, whereas the rays passing through the central part are corrected for the spherical aberration incurred in passing the second transparent layer. The invention rests on the insight that the correction of the central part of the objective lens for a thickness of the transparent layer different from the thickness of the transparent layer for which the annular part is corrected has only a relatively small influence on the quality of the first focus.

European patent application nr. 0 610 055, to which Komna et al. U.S. Pat. No. 5,446,565 corresponds, discloses an objective lens combined with a hologram or grating. The lens is corrected over its entire area for the passage of radiation through a first transparent layer thickness towards a first focus. The grating diffracts part of the radiation in a central area of the incoming radiation beam into a sub-beam which, after refraction by the lens, is corrected for passage through a second transparent layer thickness towards a second focus. The objective lens and grating converges the incident radiation beam to an outgoing beam comprising two sub-beams having different vergences. Hence, the combination of the objective lens and the grating forms two best foci. In contrast, the objective lens according to the invention converges the radiation beam to a beam having a single vergence and forms a single best focus. When the objective lens according to the invention is of a refractive-only type, a reflective-only type or a refractive-reflective-only type, it passes substantially all energy of the incident radiation beam to the first focus, and does not branch off part of the energy to a sub-beam forming the second focus. The phrase 'substantially all energy of the radiation beam' means that only normal losses due to reflections on transitions from one medium into another one, due to absorption within media, and due to opaque parts of the lens are disregarded.

A further aspect of the invention relates to an optical scanning device using an objective lens according to the invention. The scanning device is suitable for scanning a first type of record carrier having a first information plane and a first transparent layer of a first thickness and for scanning a second type of record carrier having a second information plane and a second transparent layer of a second thickness different from the first thickness. The scanning device comprises a radiation source for generating a radiation beam and an objective lens for converging the radiation beam through one of the transparent layers to a single best focus, and in which an outer annular part of the objective lens introduces a first spherical aberration compensating for passage of the radiation beam through the first transparent layer and a central part inside the annular part introduces a second spherical aberration compensating for passage of the radiation beam through the second transparent layer.

When scanning a record carrier of the second type, the part of the beam passing through the central part is well corrected for the thickness of the transparent layer of the record carrier. The improved correction of the central rays of the reflected beam results in an improved quality of the output signals of the detection system when scanning a record carrier of the second type. The invention rests on the insight that, when scanning a record carrier of the first type, the effect of the correction of the central part of the objective lens for a thickness of the transparent layer different from that of the layer through which is presently being scanned has a negligible effect on the output signals of the detection system.

BRIEF DESCRIPTION OF THE DRAWING

FIG. 1A shows a scanning device according to the invention scanning a record carrier of the first type;

FIG. 1B shows a record carrier of the second type;

FIG. 2A shows a view of the objective lens according to the invention along its optical axis;

FIG. 2B shows an objective lens according to the invention provided with an opaque ring;

DETAILED DESCRIPTION OF THE PREFERRED EMBODIMENTS

Figure 3A:
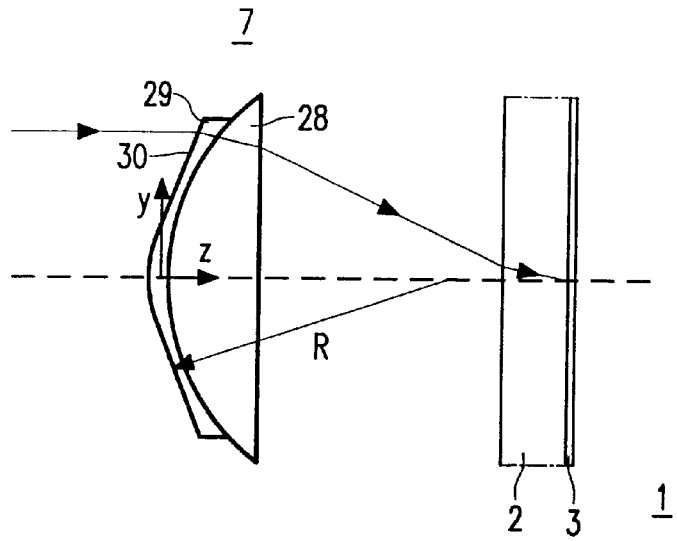
FIG. 3A shows a cross-section of a first embodiment of the objective lens.

FIG. 1A shows a device for scanning an optical record carrier 1. The record carrier comprises a transparent layer 2, on one side of which an information layer 3 is arranged. The side of the information layer facing away from the transparent layer is protected from environmental influences by a protection layer 4. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further transparent layer and information layer connected to the information layer 3. Information may be stored in the record carrier in the form of optically detectable marks arranged in substantially parallel, concentric or spiral tracks in the information layer 3, not indicated in the Figure. The marks may be in any optically readable form, e.g. in the form of pits, areas with a reflection coefficient or a direction of magnetization different from their surroundings, or a combination of these forms.

The scanning device comprises a radiation source 5, for example a semi-conductor laser, emitting a diverging radiation beam 6. A beam splitter 12, for example a semi-transparent plate, reflects the radiation towards a collimator lens 7' forming a collimated beam, which is incident on a single-focus objective lens 7. The collimator lens and the objective lens may be combined in a single objective lens. The combined collimator-objective lens 7'-7 having an optical axis 8 transforms the radiation beam 6 to a converging beam 9, having a single vergence, which forms a focus 10 on the information layer 3. Although the objective lens is indicated in the Figure as a single lens element, it may also comprise a hologram operating in transmission or reflection, or a grating for coupling radiation out of a waveguide carrying the radiation beam. Radiation of the converging beam 9 reflected by the information layer 3 and forming a reflected beam 11, returns on the optical path of the forward converging beam 9. After the objective lens 7 and collimator lens 7', the beam splitter 12 separates the forward and reflected beams by transmitting at least part of the reflected beam 11 towards a detection system 14. The detection system captures the radiation and converts it into one or more electrical signals. One of these signals is an information signal 15, the value of which represents the information read from the information layer 3. Another signal is a focus error signal 16, the value of which represents the axial difference in height between the focus 10 and the information layer 3. The focus error signal is used as input for a focus servo controller 17, which controls the axial position of the objective lens 7, thereby controlling the axial position of the focus 10 such that the focus substantially coincides with the plane of the information layer 3. The part of the detection system, including one or more radiation-sensitive detection elements and an electronic circuit processing the output signal of the detection elements, used for generating the focus error is called the focus error detection system. The focus servo system for positioning the objective lens comprises the focus error detection system, the focus servo controller and an actuator for moving the objective lens.

FIG. 2A shows a view of the objective lens 7 along its optical axis. The lens comprises an annular outer part 25 and a central part 26 inside the annular part. The central part and the annular outer part may have a common boundary line 27, as shown in the Figure, or they may be separated by an intermediate ring.

The objective lens 7 has been designed to form a best focus on the information layer 3, i.e. a focus with a Strehl ratio approaching 1. For this reason the objective lens 7 has been corrected for the spherical aberration incurred by the converging beam 9 when passing the transparent layer 2 of the record carrier 1. The wavefront of the converging beam close to the focus 10 is substantially spherical. FIG. 1B shows a record carrier 21 of another type having an information layer 23 and a transparent layer 22 of a thickness different from the thickness of the transparent layer 2. The information layer 23 may be scanned properly by means of the converging beam 9 when the information layer is arranged axially not at the position of the best focus but near or at the position of the paraxial focus of the converging beam 9.

When the information layer 23 is positioned at an axial location away from the paraxial focus, the quality of the focal spot reduces rapidly, leading to a reduced quality of the signals generated in the detection system 14. In a small range around the position of the paraxial focus the wavefront of the aberrated converging beam is substantially spherical in a central part of the aperture. The focus comprises a small, central region of high intensity resulting from rays in the central part of the aperture, and a large region of low intensity surrounding the small region and resulting from rays outside the central part. The quality of the central region of the focus is then sufficient for properly scanning the information layer 23, while the outer region can be made not to affect the scanning.

When scanning the information layer 23 of record carrier 21 with the paraxial focus, the central part of the wavefront is relatively flat, but the outer part of the wavefront is strongly deviated. The deviation changes the direction of the marginal rays, making it possible to intercept the marginal rays before detection, and thereby removing a major part of the disturbing influence of the uncompensated spherical aberration from the signals generated by the detection system.

The sizes of the central part and of the annular part depend amongst others on the numerical aperture of the objective lens 7, the difference between the first and second thickness of the transparent layers 2 and 22 respectively and their refractive indices. The determination of the optimum size of the central part and its tolerance have been described in U.S. Pat. No. 5,708,638, more specifically in the paragraphs explaining equation (1) of that application and equation (2b) giving a preferred embodiment. As an example, a device is designed to scan a record carrier of the first type having a transparent layer thickness of 0.6 mm with a radiation beam of wavelength $\lambda=635$ nm and $NA_0=0.60$, $NA_0$ being the numerical aperture of the entire radiation beam 9. The device must also be able to scan a record carrier of the second type having a transparent layer thickness of 1.2 mm ($\Delta d=0.6$ mm), refractive index of 1.58 and smallest details in the form of a track pitch having $p=1.6$ $\mu$m. The optimum value of $NA_c$, i.e. the numerical aperture pertaining to the central part, is 0.33. Since the value of $NA_c$ over $NA_0$ is equal to $0.33/0.60=0.55$, the diameter of the central part 26 is also equal 0.55 times the diameter of the entire cross-section of the reflected beam 11 at the position of the objective lens. The tolerance on the value of $NA_c$ and the size of the central part is relatively large because of the counteracting effects of on the one hand spherical aberration which increases the spot size with increasing aperture and on the other hand diffraction which decreases the spot size with increasing numerical aperture. For low performance devices the tolerance is $\pm 25\%$ and for high-performance devices the tolerance is preferably equal to $\pm 10\%$.

FIG. 3A shows an embodiment of the objective lens 7 according to the invention designed for converging a collimated beam of radiation with an NA of 0.6 to a focus through the transparent layer 2 made of Polycarbonate (PC) having a thickness of 0.6 mm and a refractive index of 1.58 at the design wavelength of 650 nm. The objective lens comprises a spherical-flat glass body 28 and a transparent layer 29 of Diacryl having a refractive index of 1.566 giving both the annular part and the central part of the lens an aspherical outer surface 30. The transparent layer 29 may be applied to the glass body 28 by the replication technique known from inter alia European patent nr. 0 156 430. The annular part, having an inner radius of 1.089 mm, introduces an amount of spherical aberration which compensates for a passage of the converging radiation beam 9 through the 0.6 mm PC transparent layer 2. The central part of the lens, inside the annular part, introduces a spherical aberration in the radiation beam which compensates for a passage through a 1.2 mm PC transparent layer 22. The quality of the objective lens is further improved by making the effective focal lengths of the central part and the annular part substantially equal, so that radiation passing through the central part constructively contributes to radiation passing through the annular part, together forming the first focus. The scanning through the 0.6 mm layer is improved by choosing the thickness of the central part such that the RMS wavefront deviation of the radiation beam near the first focus, i.e. after passing through the 0.6 mm layer, has a minimum value. This entails making the average wavefront deviation in the central part equal to the average wavefront deviation in the annular part. The wavefront correction due to the thickness correction is of the order of $0.1\lambda$ with respect to a central part having only a $4^{th}$ degree compensation for spherical aberration and a $2^{nd}$ degree correction for focus. The thickness correction amounts to about $0.2\lambda$ in terms of material thickness of the lens. The thickness correction is an additional measure without which scanning through the 0.6 mm layer is also possible.

The data of the first embodiment of the lens are:

| | |
|---|---|
| focal length | 3.30 mm |
| thickness on the optical axis | 1.85 mm |
| refractive index of body 28 | 1.6991 |
| optical diameter | 3.96 mm |
| radius of curvature (R) of the body | 2.516 mm |
| free working distance | 1.82 mm |
| thickness variation of layer 29 | 24 $\mu$m at y = 0.00 mm |
| | 0.6 $\mu$m at y = 1.30 mm |
| | 44 $\mu$m at y = 1.98 mm. |

The shape of the outer surface 30 of the annular part 25 is given by the polynomial $$z = \sum_{n=1}^{n=5} a_{2n} y^{2n} \qquad (1)$$

where $a_2=0.22111850$, $a_4=0.00406762$, $a_6=-0.00001517$, $a_8=-0.00000514$ and $a_{10}=-0.00000348$. The annular part 25 extends from $y=0.55*1.98=1.089$ mm to $y=1.98$ mm.

The shape of the outer surface 30 of the central part 26 is given by $z+\Delta z$, whereby $z$ is given by equation (1) and $\Delta z$ by $$\Delta z = 0.63 * 10^{-3} \left[ \left( \frac{y}{y_{max}} \right)^4 - \left( \frac{y}{y_{max}} \right)^2 + 0.16667 \right] \qquad (2)$$

where $Y_{max}=1.089$ mm. The term $\Delta z$ comprises a Zernike polynomial giving a focus correction appropriate for the spherical aberration the term introduces into the radiation beam. The quadratic term in the polynomial is the correction of the focal length and the constant term is the thickness correction.

When the objective lens comprises only the spherical aberration compensation in its central part, the preferred position of the information layer 23 is at the paraxial focus of the lens. When the objective lens comprises both the spherical aberration compensation and the focus correction, the preferred position of the information layer 23 is a short distance away from the paraxial focus towards the best focus in order to minimize the wavefront deviation. The short distance is about two focal depths of the beam passing through the central part 26, i.e. of a beam having a numerical aperture of $NA_c$. The focal depth is equal to $\lambda/[2(NA_c)^2]$. When for example the wavelength $\lambda$ is equal to 650 nm and $NA_c$ is equal to 0.33, the short distance is equal to 6 $\mu$m. Any reference to the position of the paraxial focus herein below is supposed to be a reference to the preferred position.

In general, a focus is correctly positioned on an information plane if the focus error signal 16 has a zero value. When in a scanning device having an objective lens according to the above first embodiment the focus servo system has been adjusted such that the first focus located on the first information layer 3 is at a zero-crossing of the focus error signal, the second focus is in general not accurately located on the information layer 23 at the zero-crossing of the focus error signal. This can be remedied by adding a constant focus offset voltage to the focus error signal 16 when scanning a record carrier of the second type. The drawback of an offset voltage dependent on the type of record carrier being scanned can be overcome by modifying the objective lens. Thereto a focus correction is added to the central part of the objective lens, giving the central part a focus correction different from the correction appropriate for the spherical aberration it introduces in the beam. The extra focus correction takes care that the second focus is located on the second information layer at a zero-crossing of the focus error signal. The magnitude of the extra focus correction is of the order of a focal depth of the objective lens, i.e. of the order of 1 μm, and may depend on the geometry of the focus error detection system. The record-carrier-dependent additional focus offset voltage is then no longer necessary.

A second embodiment of the objective lens according to the invention incorporating the above-mentioned extra focus correction has a cross-section similar to the cross-section of the first embodiment shown in FIG. 3A and may be also be made using the replication technique. The shape of the outer surface of the annular part is the same as in the first embodiment and are given by the above equation (1) and the values of the constants given directly below the equation. The shape of the outer surface of the central part is given by z+Δz', whereby z is given by equation (1) and Δz' by $$\Delta z' = 0.63 * 10^{-3} \left[ \left( \frac{y}{y_{max}} \right)^4 - 1.13 \left( \frac{y}{y_{max}} \right)^2 + 0.23 \right] \quad (3)$$

Figure 3B:
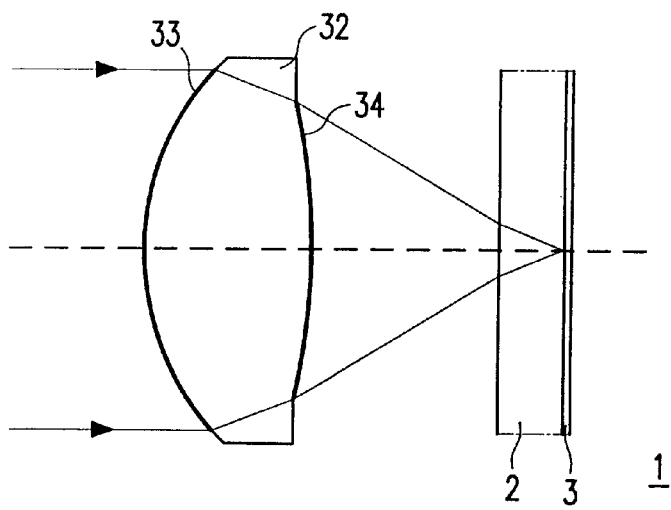
FIG. 3B shows a cross-section of a third embodiment of the objective lens.

A third embodiment of the objective lens according to the invention is a biaspheric lens 32 made of a single plastic material for instance by injection moulding. FIG. 3B shows a cross-section of the lens 32. The material of the lens is Polymethyl-methacrylate (PMMA) having a refractive index of 1.4885 at the design wavelength of 650 nm.

The data of the third embodiment of the lens are:

| | |
|---|---|
| focal length | 3.30 mm |
| thickness on the optical axis | 2.95 mm |
| optical diameter | 3.96 mm |
| free working distance | 1.5 mm. |

The lens has two surfaces 33 and 34, the first one facing the radiation source, the second one facing the record carrier 1. The shape of the surface 33 in the annular part of the lens is given by the polynomial for z in equation (1) in which the constants have the values: $a_2=0.25317630$, $a_4=0.00671352$, $a_6=0.00045753$, $a_8=-0.00010526$ and $a_{10}=0.00000860$. The annular part extends from y=1.089 mm to y=1.98 mm. The shape of the surface 33 in the central part is given by z+Δz, whereby z is given by equation (1) and the constants given in the previous sentence and Δz is given by equation (2) with the factor 0.63 replaced by 0.73.

The shape of the surface 34 over the width of the radiation beam is given by equation (1) in which the constants have the values: $a_2=-0.10009614$, $a_4=0.02163729$, $a_6=-0.00788082$, $a_8=0.00205921$ and $a_{10}=-0.00023477$.

A fourth embodiment of the objective lens according to the invention is a lens as shown in FIG. 3B which has the same shape of the surfaces 33 and 34, but where the shape of the central part is not given by z+Δz but by z+Δz', in which Δz' is given by equation (3) with the factor 0.63 replaced by 0.73. This lens has the extra focus correction comparable to the second embodiment.

It will be clear that similar embodiments of the objective lens according to the invention are possible when the objective lens 7 and the collimator lens 7' are combined in a single optical element. Whereas the above embodiments have one finite conjugate, such a single optical element has two finite conjugates.

As stated above, the marginal rays of the radiation beam 11 must be intercepted before detection when scanning a record carrier of the second type. Rays in the central region of the radiation beam 11 will be converged properly towards the detection system 14, whereas the marginal rays of the radiation beam 11 have such a large angular deviation due to the spherical aberration, that they will not be intercepted by the detection system 14. However, rays in an intermediate region between the central region of the beam and the marginal rays will still be incident on the detection system although these rays do not have the proper spherical aberration correction for the first type of record carrier, thereby lowering the quality of the detection signals formed by the detection system.

This problem can be solved by providing the scanning device with an opaque ring, which may be arranged on the objective lens. The word 'opaque' means that light incident on the ring does not follow the path it would have followed in the absence of the ring, i.e. such light does not fall on the detection system anymore. The ring forms a solution for the same problem as the extra focus correction of the second and fourth embodiment of the objective lens. Hence, a scanning device having a ring does not require a record-carrier-dependent additional offset voltage in the focus servo system.

FIG. 2B shows an objective system 35 having such an opaque ring. An annular part 36 and a central part 37 are separated by an intermediate ring 38. The shape of the annular part and the central part may be according to the first or third embodiment described above. The inner circle of the ring 35 is preferably located at the position of the boundary line 27 of the embodiment of the lens shown in FIG. 2A with a tolerance of ±10% of the radius of the entire cross-section of the radiation beam at the location of the ring. The width of the ring depends amongst others on the geometry of the detection system 14. A wide ring effectively removes unwanted rays from the detection system, whereas a small ring has a higher throughput of radiation. As a compromise, a ring arranged in the forward and reflected radiation beam has preferably a width between 5% and 25% of the mentioned radius and has an optimum width of 10%.

The ring may have several embodiments. It may comprise one ore more deep 'V' grooves or hills which refract the incident light on the ring in directions where they hardly or not at all affect the detection signals anymore. The ring may also comprise a series of small, shallow pits or grooves operating as a grating which diffracts the incident light away from the ongoing beam. Such a grating can easily be applied to a lens made up of a glass body and a transparent layer covering one or both sides of the body and to a plastic lens. The ring may comprise a reflective thin film coating for reflecting light incident on the ring. The ring may also comprise an absorbing layer such as ink to absorb incident light. The ring may comprise 2(2n+1) sections of equal length, where n=0, 1, 2, . . . , and sections are alternately transparent and opaque. Such a ring, operating on the way forth and back, forms an effective obstruction for radiation incident on the ring, and at the same time has the advantage that it passes more radiation diffracted in higher orders by the record carrier than a uniformly opaque ring.

Each of these rings may be arranged on either side of an objective lens having one finite conjugate or of an objective lens having two finite conjugates. The ring may also be arranged on the beam splitter 12 in FIG. 1 such that it does not interact with the radiation beam 6 from the laser 5 but only with the reflected radiation beam 11. When using a semi-transparent plate as beam splitter, as shown in FIG. 1, the ring may be applied to the side of the plate directed towards the detection system 14. When the ring is arranged only in the reflected beam 11, the ring is preferably wider than the ring arranged on the lens, and runs preferably from 55% to 75% of the radius of the reflected beam at the location of the ring with a tolerance of ±5% of the mentioned radius. This arrangement yields a more robust read-out of information when a record carrier of the first type is tilted.

Figure 4:
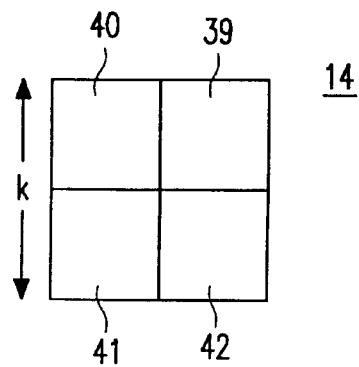
FIG. 4 shows a detection system of the scanning device.

FIG. 4 shows an embodiment of the detection system 14. The detection system comprises a quadrant detector having four radiation-sensitive detection elements 39, 40, 41 and 42. The radiation beam 11 incident on these elements has been made astigmatic, for instance by the passage through the oblique plate 12 shown in FIG. 1. The four electric output signals of the detection elements may be used to form a focus error signal according to the so-called astigmatic method, known from inter alia U.S. Pat. No. 4,358,200. On the one hand, the size of the elements must be large enough to capture most of the radiation beam when scanning a record carrier of the first type. On the other hand, the size must be sufficiently small not to intercept the marginal rays when scanning a record carrier of the second type. The compromise size of the elements depends on the wavelength of the radiation, the numerical aperture $NA_D$ of the objective lens on side of the detection system and the amount of astigmatism introduced in the radiation beam 11. The length k of one side of the detection system square lies preferably in a range from 0.6 times $k_{opt}$ to 1.4 times $k_{opt}$, where the optimum value for k, $k_{opt}$, is given by $$k_{opt} = \frac{2(W_{22} + 1.5)\lambda}{NA_D} \quad (4)$$

where $W_{22}$ is the peak-valley astigmatic wavefront deformation expressed in units of the wavelength, introduced in the reflected beam 11 and measured over the entire cross-section of the beam. The tolerance on k implies that the detector shape is not limited to a square but may be rectangular within the tolerance range. A common amount of astigmatism introduced in the beam 11 is 5λ. When $NA_D$ is equal to 0.1 and the wavelength equal to 650 nm, the length k lies preferably between 118 μm and 51 μm with an optimum value at 85 μm.

When no astigmatism is introduced in the radiation beam 11, the upper value of the preferred range for the size k of the detection system is given by $$k_{max} = 16 \, W_{40} \left(\frac{NA_1}{NA_0}\right)^3 \frac{\lambda}{NA_D} \quad (5)$$

where $W_{40}$ is the spherical aberration due to a single pass through the thickness difference at the largest diameter of the radiation beam 11, i.e. at the numerical aperture $NA_0$, and $NA_1$ is the numerical aperture at the inner circle of the annular part of the radiation beam 9. The term $W_{40}$ in units of a wavelength is given by $$W_{40} = \frac{(n^2 - 1)}{8n^3} \frac{\Delta d}{\lambda} (NA_0)^4 \quad (6)$$

where n is the refractive index of the transparent layer and Δd the thickness difference between the layers 2 and 22. The lower value of the preferred range for k is 0.6 times $k_{max}$. In one of the embodiments of the objective lens without opaque ring and having an annular part extending from 0.55 to 1 times the diameter of the radiation beam, the value of $NA_1/NA_0$ is 0.55 and the maximum size of the detection system is given by $k_{max}=15\lambda/NA_D$. With the above values of λ and $NA_D$ this yields $k_{max}=98$ μm and a lower bound of 59 μm. In one of the embodiments having a ring 38 extending from 0.55 to 0.65 times the diameter of the radiation beam, the value of $NA_1/NA_0$ is 0.65 and the maximum size of the detection system is given by $k_{max}=25\lambda/NA_D$. With the above values of λ and $NA_D$ this yields $k_{max}=162$ μm and a lower bound of 97 μm. The larger allowed size of the detection system when using an opaque ring is due to the suppression by the ring of rays at the transition from the central part to the annular part.

The magnitude of the astigmatism $W_{22}$ is preferably such that $1.4 \, k_{opt} \leq k_{max}$.

A series of experiments has been conducted to show the quality of various signals derived from the detection system when using different objective lenses in an optical scanning device. The thickness of the first transparent layer 2 of the first type of record carrier was 0.6 mm and that of the second transparent layer 22 of the second type of record carrier as 1.2 mm. The numerical aperture of the entire lens was 0.6. The information signal derived from the four output signals of the four detection elements 37–40 when scanning a record carrier of the second type had about the same quality when using an objective lens without the spherical aberration compensation according to the invention and when using an objective lens according to the invention. This shows that the presence of the central part in the objective lens having a spherical aberration compensation for a different substrate thickness does not noticeably influence the quality of the information signal when reading record carriers of the first type.

When reading a record carrier of the second type using an objective lens without the spherical aberration compensation according to the invention the jitter in the information signal was about 8%. When using an objective lens having a spherical aberration correction in the central part according to the invention, the jitter reduced to 6%. The addition of the extra focus correction according to the second embodiment of the objective lens lowered the jitter to 5%. The jitter was also 5% when the extra focus correction was replaced by an opaque ring. It is remarked that an advantageous reduction is also achieved when the ring is applied to a lens system which, over both the central part and annular part, is corrected for the spherical aberration compensating for passage of the radiation beam through the first transparent layer.

The quality of the focus error signal depends strongly on the quality of the astigmatic focal lines formed by the radiation beam 11 near the detection system. The first embodiment of the objective lens when scanning a record carrier of the second type gives a substantial improvement of the quality of the focal lines compared to the focal lines using an uncorrected objective lens. The improved quality increases the capture range of the focus servo system and allows the use of larger detection elements, thereby improving the detection when reading record carriers of the second type. It also increases the positing tolerance of the detection system 14. In a specific scanning device using an uncorrected, known objective lens a 10 μm position error of the detection system resulted in a focus offset of 2 μm. When using a corrected objective lens in the same device having the 10 μm position error, the focus offset was less than 0.2 μm.

We claim:

1. An objective lens for converging a radiation beam to a single best focus, the objective lens having an annular part which introduces a first spherical aberration in the radiation beam which compensates for passage of the radiation beam through a first transparent layer having a first thickness, and a central part inside the annular part which introduces a second spherical aberration in the radiation beam which compensates for passage of the radiation beam through a second transparent layer having a different, second thickness.

2. Objective lens according to claim 1, wherein the central part and the annular part of the objective lens have effective focal lengths which are substantially equal.

3. Objective lens according to claim 1, wherein the average thickness of the central part of the objective lens is such that the RMS wavefront deviation after passage through the first transparent layer has a minimum value.

4. Objective lens according to claim 1, wherein the objective lens comprises an opaque intermediate ring arranged between the central part and the annular part.

5. An optical scanning device for scanning a first type of record carrier having a first information plane and a first transparent layer of first thickness and for scanning a second type of record carrier having a second information plane and a second transparent layer of a second thickness different from the first thickness, comprising a radiation source for generating a radiation beam and an objective lens for converging the radiation beam through one of the transparent layers to a single best focus and a paraxial focus, and in which an annular part of the objective lens introduces a first spherical aberration which compensates for passage of the radiation beam through the first transparent layer and a central part inside the annular part introduces a second spherical aberration which compensates for passage of the radiation beam through the second transparent layer.

6. Optical scanning device according to claim 5, wherein the device comprises means for positioning the best focus of the radiation beam substantially on the first information plane and the paraxial focus of said radiation beam substantially on the second information plane.

* * * * *